US010673630B2

(12) United States Patent
Pakkan et al.

(10) Patent No.: US 10,673,630 B2
(45) Date of Patent: Jun. 2, 2020

(54) CLOUD BASED WIFI NETWORK SETUP FOR MULTIPLE ACCESS POINTS

(71) Applicant: Airties Kablosuz Iletisim Sanayi Ve Dis Ticaret A.S., Istanbul (TR)

(72) Inventors: Mujdat Pakkan, Istanbul (TR); Metin Ismail Taskin, Istanbul (TR); Irfan Acar, Istanbul (TR); Kivanc Cakmak, Istanbul (TR)

(73) Assignee: AIRTIES KABLOSUZ ILETISIM SANAYI VE DIS TICARET A.S., Istanbul (TR)

( * ) Notice: Subject to any disclaimer, the term of this patent is extended or adjusted under 35 U.S.C. 154(b) by 0 days.

(21) Appl. No.: 15/977,118

(22) Filed: May 11, 2018

(65) Prior Publication Data

US 2018/0331828 A1 Nov. 15, 2018

Related U.S. Application Data

(60) Provisional application No. 62/575,021, filed on Oct. 20, 2017, provisional application No. 62/504,999, filed on May 11, 2017.

(51) Int. Cl.
*H04L 9/30* (2006.01)
*H04W 12/04* (2009.01)
(Continued)

(52) U.S. Cl.
CPC ............ *H04L 9/30* (2013.01); *H04L 41/0876* (2013.01); *H04L 63/062* (2013.01);
(Continued)

(58) Field of Classification Search
CPC ... H04W 72/046; H04W 72/04; H04W 12/04; H04W 84/12; H04W 88/16; H04W 88/08;
(Continued)

(56) References Cited

U.S. PATENT DOCUMENTS

2003/0050068 A1* 3/2003 Woxberg ............... H04W 28/26
455/450
2004/0213410 A1* 10/2004 Gupta .................. H04Q 3/0025
380/270
(Continued)

FOREIGN PATENT DOCUMENTS

EP 1686726 A1 8/2006

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 9: Interworking with External Networks, IEEE Std. 802.11u-2011 (Feb. 25, 2011).
(Continued)

*Primary Examiner* — Abu S Sholeman
(74) *Attorney, Agent, or Firm* — Volpe and Koenig, P.C.

(57) ABSTRACT

Methods, systems, and devices for facilitating the automated configuration of one or more new 802.11 access points (APs) are disclosed herein. A cloud server may receive a message associated with a customer account for one or more new APs. The cloud server may associate a first AP of the one or more new APs based on the message. The cloud server may then retrieve a public key associated with the first AP which has a reciprocal private key. The cloud server may send the public key to a gateway (GW) associated with the customer account. The GW may encrypt the GW credentials, such as a password and SSID, into a ciphertext using the public key and then broadcast this information. When the first AP has been powered on it may decrypt the ciphertext using the private key and use the credentials to act as a node in the GW's network.

23 Claims, 6 Drawing Sheets

(51) Int. Cl.
*H04L 12/24* (2006.01)
*H04L 29/06* (2006.01)
*H04W 24/02* (2009.01)
*H04W 12/00* (2009.01)
*H04L 29/08* (2006.01)
*H04W 88/08* (2009.01)
*H04W 88/16* (2009.01)
*H04W 84/12* (2009.01)

(52) U.S. Cl.
CPC ....... *H04W 12/0023* (2019.01); *H04W 12/04* (2013.01); *H04W 24/02* (2013.01); *H04L 63/0442* (2013.01); *H04L 67/10* (2013.01); *H04W 84/12* (2013.01); *H04W 88/08* (2013.01); *H04W 88/16* (2013.01)

(58) Field of Classification Search
CPC .... H04W 12/0023; H04W 24/02; H04L 9/30; H04L 41/0876; H04L 67/10; H04L 63/062; H04L 63/0442
USPC .......................................................... 713/171
See application file for complete search history.

(56) References Cited

U.S. PATENT DOCUMENTS

| | | | | |
|---|---|---|---|---|
| 2006/0114839 | A1* | 6/2006 | Meier | H04L 41/0843 370/254 |
| 2006/0200678 | A1* | 9/2006 | Yamada | H04L 9/0833 713/182 |
| 2008/0112405 | A1* | 5/2008 | Cholas | H04L 63/062 370/389 |
| 2010/0105409 | A1* | 4/2010 | Agarwal | G01S 5/0263 455/456.1 |
| 2013/0272164 | A1* | 10/2013 | Leonardos | H04W 84/12 370/254 |
| 2014/0003331 | A1* | 1/2014 | Klein | H04B 3/50 370/328 |
| 2015/0110049 | A1* | 4/2015 | Pabla | H04B 7/0697 370/329 |
| 2015/0119045 | A1* | 4/2015 | Montgomery | H01Q 5/22 455/437 |
| 2015/0304983 | A1* | 10/2015 | Krening | H04W 64/003 370/254 |
| 2016/0055469 | A1* | 2/2016 | Kim | H04L 41/12 705/21 |
| 2016/0057122 | A1* | 2/2016 | van Bergeijk | H04L 63/18 713/168 |
| 2017/0111253 | A1* | 4/2017 | Girish | H04L 43/0876 |
| 2018/0213580 | A1* | 7/2018 | Taskin | H04L 12/2856 |
| 2018/0324668 | A1* | 11/2018 | Taskin | H04W 36/0083 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Wi-Fi Alliance, "DRAFT Device Provisioning Protocol Technical Specification," V0.2.11 (Dec. 2017).

Wi-Fi Alliance, Wi-Fi Simple Configuration Technical Specification Version 2.0.5 (Aug. 2014).

* cited by examiner

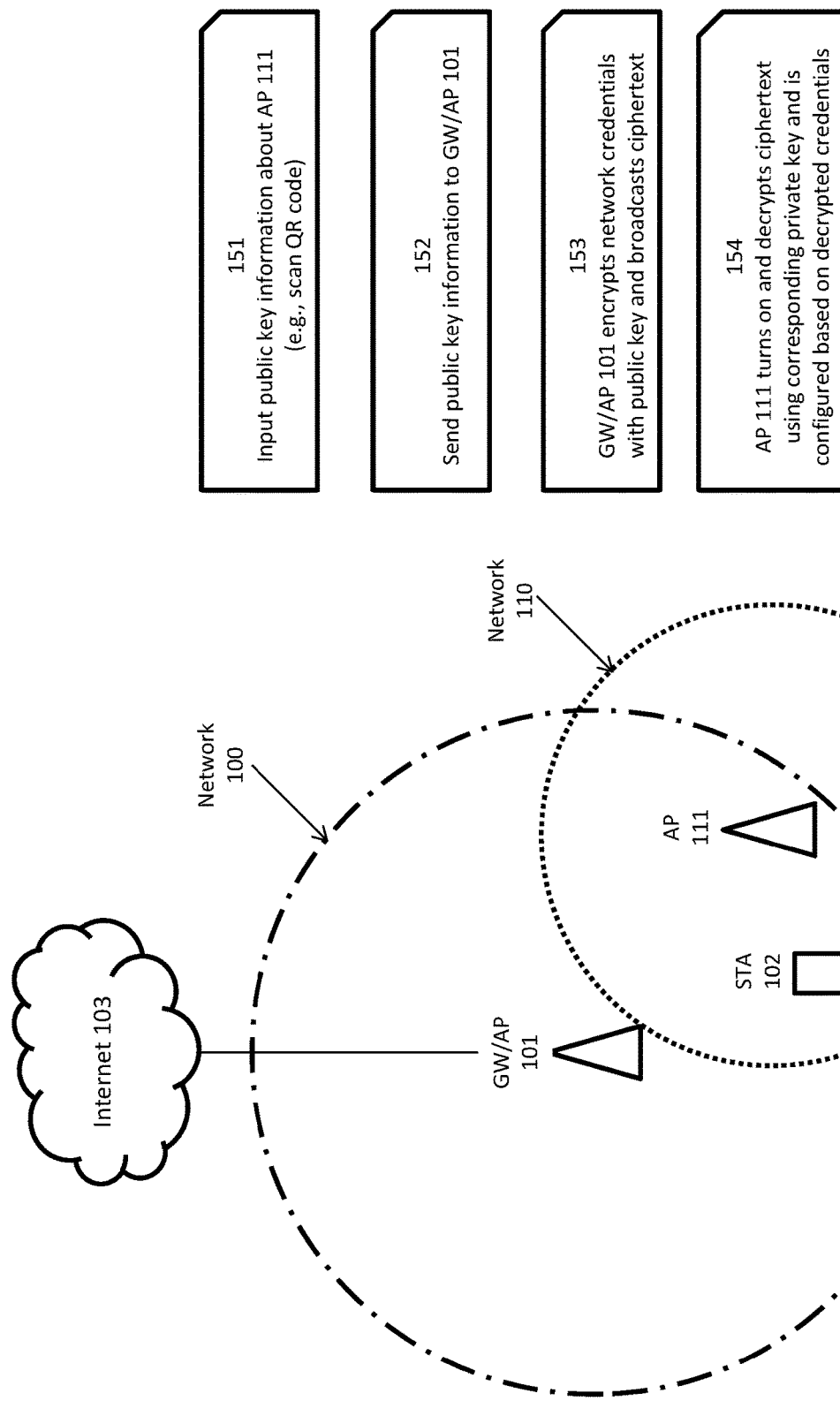

CLOUD BASED WIFI NETWORK SETUP FOR MULTIPLE ACCESS POINTS

CROSS-REFERENCE TO RELATED APPLICATIONS

This application claims the benefit of U.S. Provisional Application No. 62/504,999 filed on May 11, 2017, and U.S. Provisional Application No. 62/575,021 filed Oct. 20, 2017, the contents of which are hereby incorporated by reference herein.

FIELD OF ART

This disclosure is related to wireless communication networks.

BACKGROUND

A business or residential customer may access the Internet using a DSL, cable, or fiber modem/gateway supplied by a Broadband Service Provider (BSP). This gateway may also have an integrated wireless access point (AP), or there might be a separate wireless AP connected to the Ethernet port of the gateway, providing Internet access to WiFi devices throughout a house/premise. In large areas, the gateway may not be able to provide complete WiFi coverage to the premise. In such a scenario, the customer may complain about having insufficient WiFi coverage and request a solution to this issue from the BSP. The BSP may suggest that the customer use one or more additional wireless APs to improve the WiFi coverage. There is a need for systems, methods, and devices to assist the BSP and the customer to improve upon and make efficient the setup and configuration of a new AP.

SUMMARY

Methods, systems, and devices for facilitating the automated configuration of one or more new 802.11 access points (APs) are disclosed herein. A cloud server may receive a message associated with a customer account for one or more new APs. The cloud server may associate a first AP of the one or more new APs based on the message. The cloud server may then retrieve a public key associated with the first AP which has a reciprocal private key. The cloud server may send the public key to a gateway (GW) associated with the customer account. The GW may encrypt the GW credentials, such as a password and SSID, into a ciphertext using the public key and then broadcast this information. When the first AP has been powered on it may decrypt the ciphertext using the private key and use the credentials to act as a node in the GW's network.

BRIEF DESCRIPTION OF THE DRAWINGS

A more detailed understanding of the drawings may be had from the following description but is not intended to limit the scope of the embodiments but to merely serve as examples in conjunction with the accompanying drawings, wherein like reference numerals in the figures indicate like elements, and wherein:

FIG. 1A illustrates an example communications system where an access point is added to a wireless network;

FIG. 1B illustrates an example process for locally adding an access point to a communications system;

DETAILED DESCRIPTION

Figure 2A:
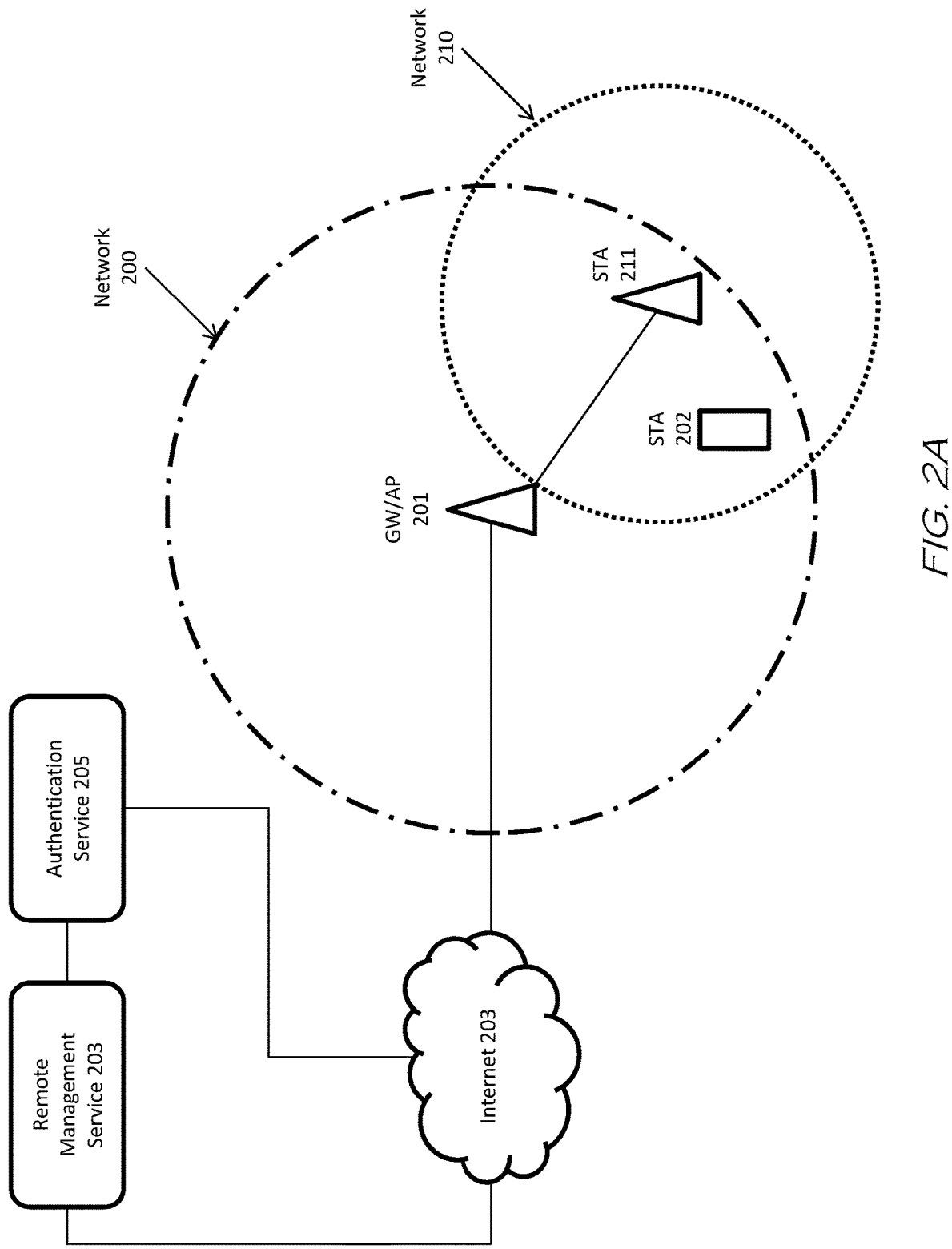
FIG. 2A illustrates an example communication system where an access point is added to a wireless network.

As discussed herein, any embodiment, example, or description may be considered in conjunction with one or more figures and is not intended to represent an exclusive example. Further, any features of systems, methods, or devices described with relation to one example or embodiment may be used in another example or embodiment and is not intended to be exclusive to one example or embodiment.

In some circumstances, there may be a need to simplify, automate, and/or make more efficient the process of adding a new access point (AP) to an 802.11 wireless communications system. Specifically, in one scenario a business or residential customer may access the Internet using a DSL, cable, or fiber modem/gateway (GW) supplied by a Broadband Service Provider (BSP). This GW may also have an integrated wireless AP (e.g., an GW/AP), or there might be a separate wireless AP connected to the Ethernet port of the GW, providing Internet access to WiFi devices throughout a house/premise. For large premises, the AP may not be able to provide complete WiFi coverage. In such a scenario, the customer may complain about having insufficient WiFi coverage and request a solution to this issue from the BSP. The BSP may then suggest that the customer use one or more additional wireless APs to improve the WiFi coverage. The BSP and the customer then have to coordinate the logistics of such an addition, such as the setup and configuration of adding one or more new APs. Also, the new APs may form a WiFi mesh network, or the new APs may act as range extenders to the existing network. In either case, setting up such a network may be difficult for some customers.

The customer may place an order for one or more new APs from the BSP who may reserve the new AP(s) for the customer by a globally unique serial numbers from a warehouse stock database. Once the new AP arrives, the customer may work with the BSP to setup and configure the new AP. Alternatively, the BSP may be able to remotely setup and configure the AP with the assistance of the BSP's cloud resources. Alternatively, the BSP may preconfigure the existing AP so that when the new AP arrives and is powered up, the new AP may automatically be configured to the existing GW/AP without the customer having to go through any configuration or setup process.

APs may use public key (e.g., asymmetrical) cryptography for the secure transfer of the network credentials to a new WiFi device/AP so that it can join an existing network. Public key based identities of the devices may be facilitated by an out-of-band technique (e.g., QR codes). The customer may trigger the provisioning of the new device by scanning a QR code with a mobile application, or the BSP may trigger this process for new devices ordered by the customer so that the devices may automatically join the network after first power-up at the customer's premise without requiring the customer to go through a setup procedure.

FIG. 1A illustrates an example communications system where an access point is added to a wireless network. In such an example communications system, there may be an existing GW/AP 101 that broadcasts a wireless signal creating a network 100. As discussed herein, an GW/AP may have a processor, memory, storage, and the like. The GW/AP 101 may be connected to the internet 103 based on a services contract between a BSP and a customer. The customer may operate a station (STA) 102, such as a smart phone. As discussed herein, a STA may be any wired or wireless device, such as a smartphone, laptop, personal computer, tablet, sensor, control switch, and the like. The STA 102 may be connected to the network 100 through the GW/AP 101 using a wired or wireless connection.

There may be a need, such as for the aforementioned reasons, to add a new AP 111 to network 100. The new AP 111 may be assigned a public key identity which may be exposed via a machine readable code, such as a QR code label. The BSP may assign the AP 111 the public key identity with an associated QR code. For example, as in the Device Provisioning Protocol of WiFi Alliance, public key (asymmetrical) cryptography may be used without a Central Authority or Public Key Infrastructure. The AP 111 may have firmware that includes software to generate a pair of keys at first boot, after the hardware is manufactured and the firmware is installed on its flash disk. A system initialization script on the AP 111 may check if the key pair exists and generate a key pair if one does not exist.

To ensure that the identity of the device does not change throughout the course of its lifetime, the key pair may be stored in a Write Once Read Many (WORM) data storage device. If the hardware does not support WORM, the key pair may be stored in a separate partition and access to it may be restricted to emulate a similar functionality. For example, IOCTL (Input/Output Control) system calls may be used for storing and reading the key pair. Such an approach will significantly reduce the probability of accidental erasure or corruption during a firmware upgrade.

The public key may be disseminated widely but the private key must be kept secret. Only the paired private key may decrypt a message encrypted with the public key. The existing credentials of network 100 may be encrypted with this public key and broadcast by the GW/AP 101.

In one scenario, the public key may be accessed by workers where the AP 111 is manufactured through the console of the GW/AP 101 via a specific command that reads it from the WORM device or separate partition. This public key may be unique information as well as identifying information such as serial number and/or MAC address, and this unique information may be converted to a two dimensional QR code, which is then printed on a label to be affixed on the device. In another scenario, the public key and the identifying information may be stored in a database for later use (i.e., supplying a new AP).

The public key of the GW/AP 101 may also be accessed, for example, through a web server on the GW/AP 101. However, the GW/AP 101 must have already obtained an IP address in order to be able to download the public key (or QR code text and/or image) from another computer on the local network. This feature may be helpful when the QR code label is lost or damaged and console access is not available.

FIG. 1B illustrates an example process for locally adding an access point to a communications system, such as that shown in FIG. 1A. As discussed, the AP 111 may be assigned unique information, such as a public key based identity and an associated QR code label that may be affixed to the AP 111. A customer may use STA 102, such as a smartphone, with a rich user interface to setup the AP 111. A special mobile application may be used on the STA 102 for home network management. The customer may configure his/her network with this application and also log in to his/her cloud server account. This application may also have an embedded QR code scanner functionality, or other out of band functionality, for use in new device provisioning.

At 151, after the customer receives a new device (e.g., AP 111), he or she simply scans the QR code on the device with the mobile application on STA 102. At 152, the application extracts the public key of the new device from the QR code and sends it to the GW/AP 101.

In one scenario, when the STA 102 is connected to the WiFi network 100 of the GW/AP 101, via for example WiFi Protected Access II (WPA2) Personal security protocol, the STA 102 may use HTTP POST request method to send the public key enclosed in the body of the request message to a web server on the GW/AP 101. A special Common Gateway Interface (CGI) script on the GW/AP 101 may receive the public key of the new AP 111. The GW/AP 101 may then encrypt its network credentials (e.g., SSID, password, security protocol) with the public key of the new AP 111. The GW/AP 101 may then add this ciphertext to the Application Extension attribute of the WiFi Simple Configuration (WSC) Information Element (IE) of its beacons and probe responses. This information may be encoded in a binary type identifier, length, and value (TLV) format. A specific 16-byte UUID of the Application Extension attribute identifies that the data that follows is a ciphertext of the network credentials.

At 153, the GW/AP 101 may encrypt the credentials for network 100 using the public key and broadcast the resulting ciphertext. At 154, when the new AP 111 is turned on, it may start in a STA mode and scan all available channels. In this STA mode, the new AP 111 may perform both passive and active scans, by processing the received beacons in each channel and also sending probe requests and then processing the received probe responses. Also, the new AP 111 may look for WSC IEs, and when it finds one it looks for the Application Extension attribute with the specific 16-byte UUID identifying the credentials ciphertext for new device provisioning. When the new AP 111 finds this data, it may attempt to decrypt the ciphertext with its own private key. If it succeeds, and the decrypted plaintext is of the correct format, the new AP 111 may connect to the GW/AP 101 with these credentials.

If the new AP 111 is configured as a range extender, it may enable its AP functionality and start accepting connections from stations in the network 100. If the new AP 111 is configured as a mesh node, it may now establish a wireless distribution system (WDS) link between itself and the GW/AP 101. In either case, the new AP 111 becomes another AP in the network 100 and may provide wider and improved WiFi coverage for the network 100 by broadcasting WiFi network 110. By completing the new AP registration process without using resources from outside of the network, this may be considered a local provisioning of configuration information.

Even though no cloud connection was required, the approach of FIGS. 1A and 1B may integrate with centralized remote management of a customer's network 100, and may also provide another layer of security if STA 102 is required to be logged in to the customers cloud account during the AP 111 addition process since, if the STA 102 was not required to be logged in, anybody connected to the local network may send an HTTP POST request to the web server of the GW/AP 101.

FIG. 2A illustrates an example communication system where an access point is added to a wireless network with cloud assistance. Cloud assistance may allow for a more efficient and/or improved AP addition process. There may be a GW/AP 201 that creates a network 200. A STA 202 may be connected to the WiFi of network 200. There may also be an Authentication Service 205 and Remote Management Service 204 that may be accessed through the GW/AP 201 through an internet connection 203. The Remote Management Service 204 may be reachable by a universal resource locator (URL). The Authentication Service 205 may authenticate a customer account and store the network 200 information under the users account. The Authentication Service 205 may also accept new AP addition requests from a management application on the STA 202 and approve or deny the requests. In some implementations, the Authentication Service 205 may employ or consult another security service or database for authentication. The Authentication Service 205 may notify the Remote Management Service 204 which APs are authenticated to be included in the network 200. The Remote Management Service 204 may be responsible for communicating with APs to set their WiFi credentials, provide instructions to APs to connect to each other, collect WiFi diagnostic data, and/or provide positioning data for AP placement.

The example shown in FIG. 2A is similar to FIG. 1A in that a new AP 211 needs to be added to extend or add to network 200, however, cloud assistance instead of local means may be employed to facilitate the addition. As discussed herein, a Remote Management Service (e.g., 204) may be operated on one or more cloud servers connected to the internet (e.g., 203). An Authentication Service (e.g., 205) may be operated on the same or remote cloud server as the Remote Management Service (e.g., 204). A cloud server may be one or more networked computers with one or more processors, memory, storage, and communication interfaces.

Figure 2B:
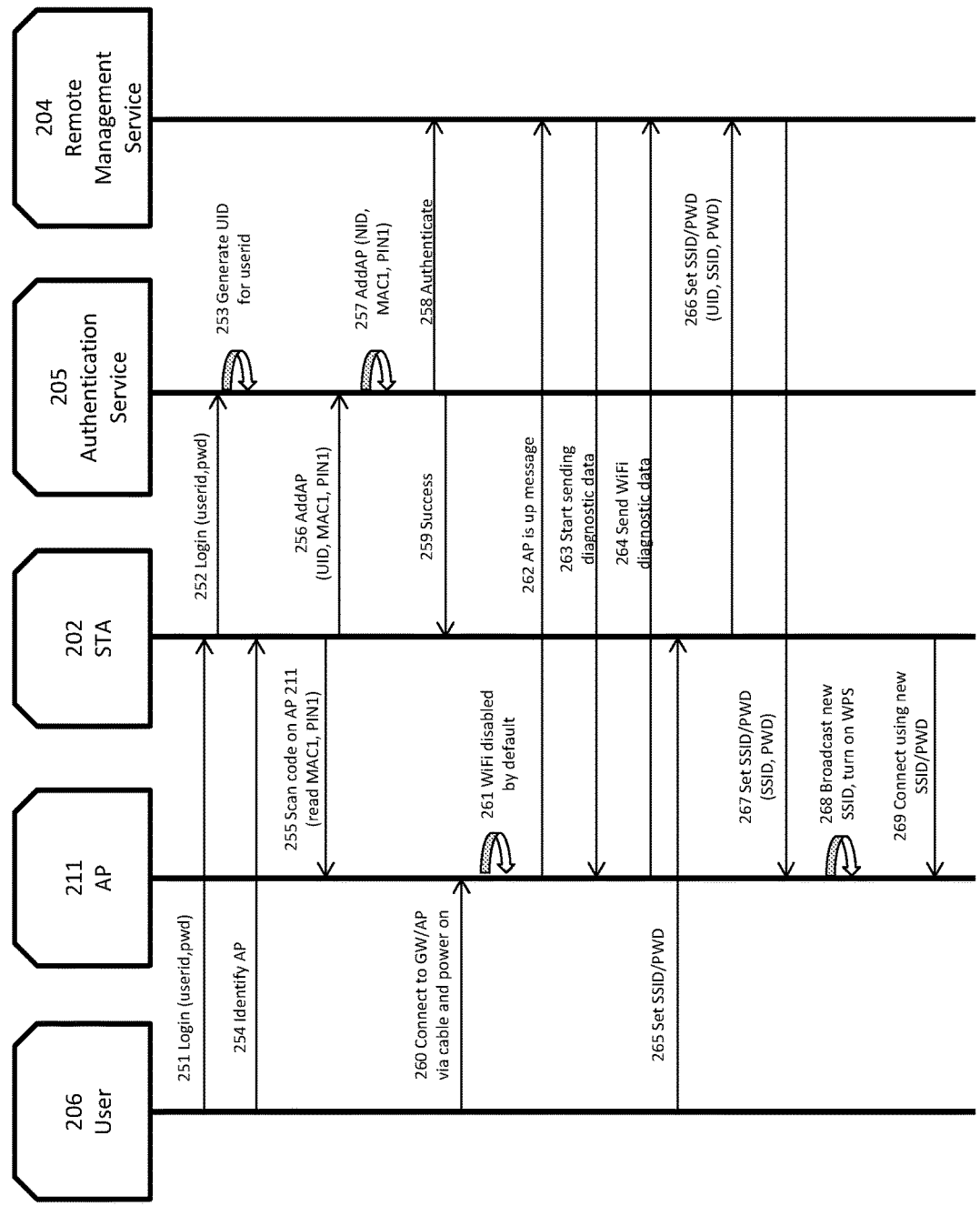
FIG. 2B illustrates an example process for adding an access point to a communications system using cloud assistance.

FIG. 2B illustrates a more detailed example process for adding an access point to a communications system using cloud assistance. In this example, an AP, such as GW/AP 201 or AP 211, may be configured with a universal and unique MAC address or serial number and a configuration PIN that are embedded into the AP during manufacturing. Both identifiers may be externally displayed, such as through a QR code, bar code, or printed text on the AP so that it may be easily accessible. The new AP 211 may have its WiFi service turned off by default and have the URL of the Remote Management Service 204 stored internally from the factory.

At 251, adding the new AP 211 may start with a User 206 providing credentials, such as pre-arranged username/password, to the the management application on a STA 202. At 252, the user login may be sent to the Authentication Service 205 and using the pre-arranged credentials. The management application on the STA 202 may also require a username/password. At 253, the Authentication Service 205 may generate a userid (UID).

At 254, the User 206 may identify the new AP 211 that will be added to the network 200. This may be accomplished, at 255, by the User 206 using the management application on STA 202 to scan a QR code on AP 211 that has encoded unique information for AP 211, such as a MAC address/serial number (MAC1) and a personal identification number (PIN1) of the AP 211. This manner of scanning the QR code, or similar means as discussed herein, ensures physical proximity to the new AP 211 indicating that the User 206 is physically close thereby preventing malicious or benign attempts to identify and configure other devices. After the unique information is collected at 256, the management application on STA 202 may send the identifiers and the PIN (UID, MAC1, PIN1) of the AP 211 over a secure Internet link to the Authentication Service 205 running on a cloud server.

At 257, the Authentication Service 205 associates the incoming AP 211 identifier and PIN information in a database with the previously sent User 206 login information. It creates a random network identifier (NID) for the network 200 under the User's 206 information, associates the AP 211 with this NID, and stores it permanently. After this is successful, at 258, the Authentication Service 205 informs the Remote Management Service 204 that the AP 211 is now authenticated for accepting messages from it and for further management.

At 259, the management application on the STA 202 is given a success indicator when the AP 211 identification is completed. The User 206 is then instructed to connect the first AP 211 to the GW/AP 201 that provides a connection to the internet 203 using a wired connection (e.g., Ethernet or MOCA) and then power the AP 211 on. At 261, the AP 211 does not allow any WiFi client device association requests because its WiFi is not configured yet. The AP 211 receives an IP address from the GW/AP 201 and may connect without any configuration needed because it is connected over a wired connection since the WiFi is disabled by default. At 262, the AP 211 sends a message to the Remote Management Service 204 indicating it is up and operating, and waiting for configuration. The Remote Management Service 204 accepts messages only from previously authenticated APs. Since the AP 211 was previously authenticated, it accepts the message and sends a message to the AP 211 to start sending WiFi data at 263. Upon receiving this message at 264, the AP 211 starts sending WiFi diagnostic data to the Remote Management Service 204.

At 265, the User 206 may now enter new WiFi SSID and credentials for the new WiFi network 210 via the management application on STA 202. These credentials may be totally new or the same as credentials from the network 200 depending on the reason for adding an AP 211 (e.g., extending a coverage using a repeater AP). The User 206 enters the new credentials into the management application on STA 202, which in turn at 266 sends them to the Remote Management Service 204. At 267, the Remote Management Service 204 then sends the new credentials to the AP 211 to take effect. The AP 211 takes the new WiFi credentials and changes its configuration accordingly. At 268 the AP 211 starts beaconing using the new SSID and starts authenticating incoming client requests using the new credentials.

In one case, at 269, the management application running on STA 202 attempts to connect to the new WiFi network 210 using the new credentials. Once the new credentials take effect on the AP 211, STA 202 is able to associate to the AP 211 using the new credentials and connect to network 210.

In an alternative process based on the example of FIG. 2A and similar to the process of FIG. 2B, an AP 211 may be added to the network of 200. However, the STA 202 may scan and send a public key of the new AP 211 to a cloud server (e.g., Remote Management Service 204) through an Authentication Service 205. The customers STA 202 may connect to the cloud server via the internet either though a mobile phone network (not shown) or the existing WiFi network 200. The cloud server may then respond with the public key to the GW/AP 201 through its Internet connection (e.g., via for TR-069 and XMPP) as a parameter of a custom command, such as "AddNewNode." The GW/AP 201 may proceed sending a ciphertext and the AP 211 may decode it and be configured similar to the example related to FIGS. 1A and 1B as discussed herein.

Figure 3A:
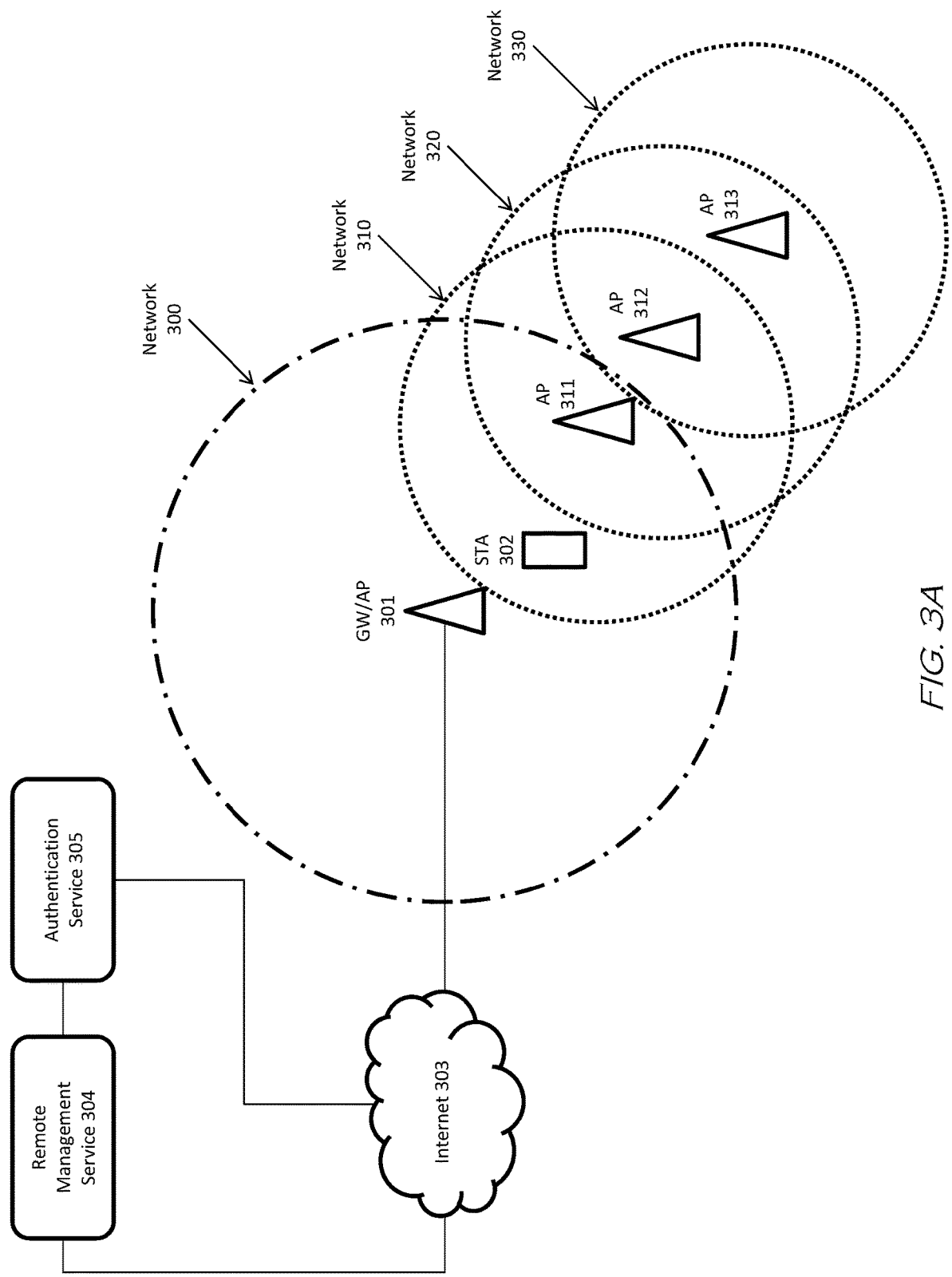
FIG. 3A illustrates an example communication system where one or more second access points are added to a wireless network.

FIG. 3A illustrates an example communication system where a plurality of access points are added to a wireless network. Just as in FIG. 2A, a new AP 311 may be added to a network 300 of GW/AP 301 that connects to the internet 303. Once new AP 311 is added, it may provide coverage through WiFi network 310 to any client device that may associate with new credentials. To extend the WiFi coverage, a customer may add another new AP 312 to generate WiFi network 320, and another new AP 313 to generate WiFi network 330, and so on until the customer's objective is achieved (e.g., complete coverage of the premises).

Figure 3B:
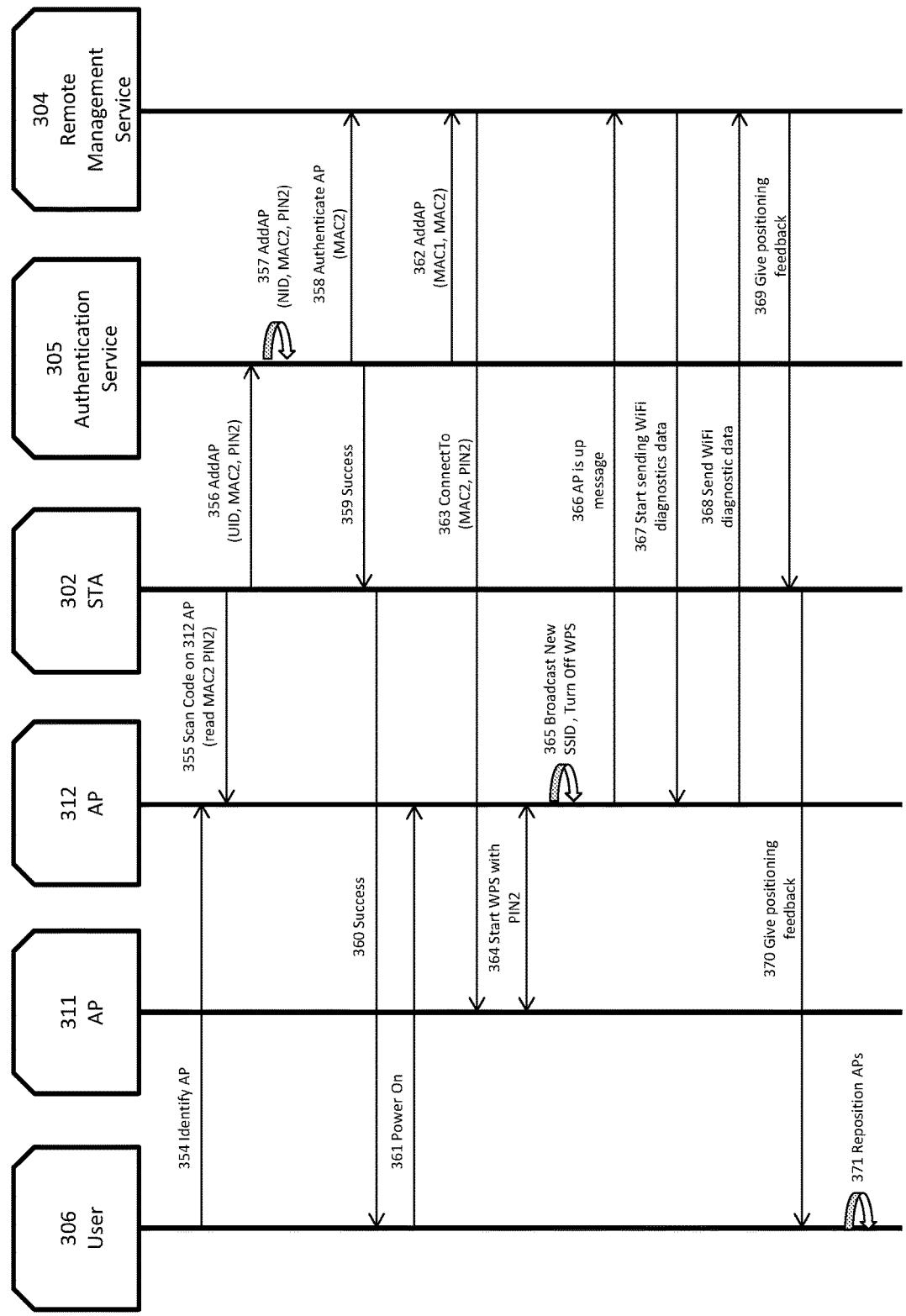
FIG. 3B illustrates an example process of adding one or more second access points and determining the optimal physical location in the network using cloud assistance.

FIG. 3B illustrates an example process of adding one or more second access points and determining the optimal physical location in the network using cloud assistance. To add a second new AP 312 to the network 300, a User 306 may first be instructed via a management application on STA 302 to place the AP 312 in close proximity to AP 311. Similar to the example of FIG. 2B, the User 306 may go through an AP addition process similar to adding AP 211. At 354, the User 306 may identify an additional AP (i.e., AP 312) by inputting unique information about the AP (e.g., with a QR code, manually, or the like) at 355. After the input is collected, the management application on STA 302 may send the unique information comprising of a MAC address/serial number and PIN over a secure Internet link to the Authentication Service 305.

When the Authentication Service 305 receives the new AP's 312 information, it may associate this information with the User 306 through the login session from the management application on the STA 302. In some circumstances, the session may periodically require the user to re-enter login credentials for security reasons. At 356, once the User 306 is identified, the Authentication Service 305 determines that the User 306 already has a network id (NID), indicating that there is already a network 300 for this user and AP 312 should be added to network 300. At 357, the Authentication Service 305 stores the new AP's 312 information under the same NID permanently. At 358, the Authentication Service 305 notifies the Remote Management Service 304 that this new AP 312 is now authenticated for accepting messages and for further management.

At 359 the Authentication Service 305 may then notify the management application on the STA 302 of the success of the addition of AP 312. At 360 the User 306 is given a success indicator through the management application on the STA 302 that the new AP 312 identification is completed. At 361 the User 306 may then power on the new AP 312. Once the AP 312 is powered on, it waits for a WiFi Protected Startup (WPS) transaction from another access point (i.e., AP 311) to admit it into the WiFi network 310. However it does not allow for any WiFi client device association requests because its WiFi is not configured yet.

Meanwhile at 362, the Authentication Service 305 tells the Remote Management Service 304 that AP 312 needs to be connected to the existing WiFi network 310 broadcast by AP 311. At 363 the Remote Management Service 304 may send a message consisting of AP's 312 MAC address and PIN to AP 311 that it should connect to AP 312 using WPS PIN method utilizing AP's 312 PIN. Upon receiving this message at 364, AP 311 may start a WPS PIN transaction to AP 312 using its PIN. Upon successful completion of the WPS PIN transaction at 365, AP 312 may receive the same WiFi credentials as AP 311, join the WiFi network 310, receives an IP address from the gateway and is able to connect to the Internet. It may also start broadcasting the new, or same, SSID and create a WiFi network 320 and start accepting authentication requests from any WiFi client device. At 366, the AP 312 sends an UP message indicating it is up and operating to the Remote Management Service 304. The Remote Management Service 304 accepts messages only from previously authenticated APs. Since this AP 312 was previously authenticated, it accepts the message and sends a message to AP 312 to start sending WiFi data at 367. Upon receiving this message at 368, the AP starts sending WiFi diagnostic data to the Remote Management service.

At this point, AP 311 and AP 312 may be in the same network, communicating, and providing Internet access to any WiFi client device which may associate using the WiFi credentials setup by the User 306 through the management application on the STA 302. The User 306 may now move the AP 312 to get the best performance out of the WiFi network. Based on the WiFi diagnostic provided by both AP 311 and AP 312, a Remote Management Service may determine feedback for how AP 312 should be re-positioned with respect to AP 311. At 368 this feedback is sent to the management application of STA 302 as a message and the application provides visual guidance to the User 306 to re-position the AP 312. As the User 306 follows the instructions and re-positions AP 312, Remote Management Service 304 continues to process incoming WiFi diagnostics data to perfect the positioning decision and provides continuous feedback to the management application on the STA 302 at 369, which in turn provides the feedback to the User 306 at 370.

If the user would like to add more APs to the network to extend coverage, the same method described above may be used. The User 306 may be instructed to place the new AP 313 near AP 311 where the User 306 identifies the new AP 313 by inputting its code through the management application on STA 302. The new AP 313 may be authenticated by the Authentication Service 305, and the Remote Management Service 304 may request AP 311 to add AP 313 to the network using WPS PIN method utilizing its PIN. Finally, at 370, the User 206 may re-position AP 313 using the positioning feedback received from the management application on STA 302. Any number of new APs may be added to the network using these techniques described herein.

In an alternative process based on the example of FIG. 3A and similar to the process of FIG. 3B, an AP 312 may be added to the network of 300. However, the STA 302 may scan and send a public key of the new AP 312 to a cloud server (e.g., Remote Management Service 304) through an Authentication Service 305. The customers STA 302 may connect to the cloud server via the internet either though a mobile phone network (not shown) or an existing WiFi network 310. The cloud server may then respond with the public key to the GW/AP 301 through its Internet connection (e.g., via for TR-069 and XMPP) as a parameter of a custom command, such as "AddNewNode." The GW/AP 301 may proceed sending a ciphertext and the AP 312 may decode it and be configured similar to the example related to FIGS. 1A and 1B as discussed herein. Alternatively/additionally, the AP 312 may receive the ciphertext from AP 311.

For the examples in FIGS. 2A-3B, a new AP may have been added as either a mesh node or a range extender. In either case, a customer may trigger the provisioning process by scanning a QR code on the new AP by using a special application on his or her mobile device. Even though this procedure is quite straightforward and is simplified by its use of the rich user experience provided by the mobile device, it may be further automated by eliminating the customers involvement completely.

Figure 4B:
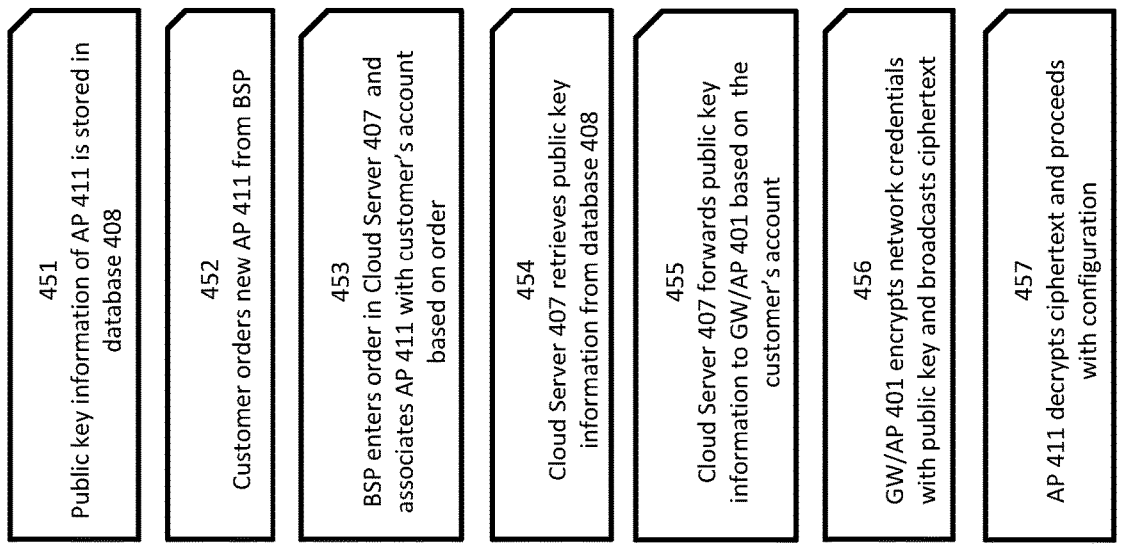
FIG. 4B illustrates an example process for adding an access point to a communications system using cloud assistance in an automated manner.
Figure 4A:
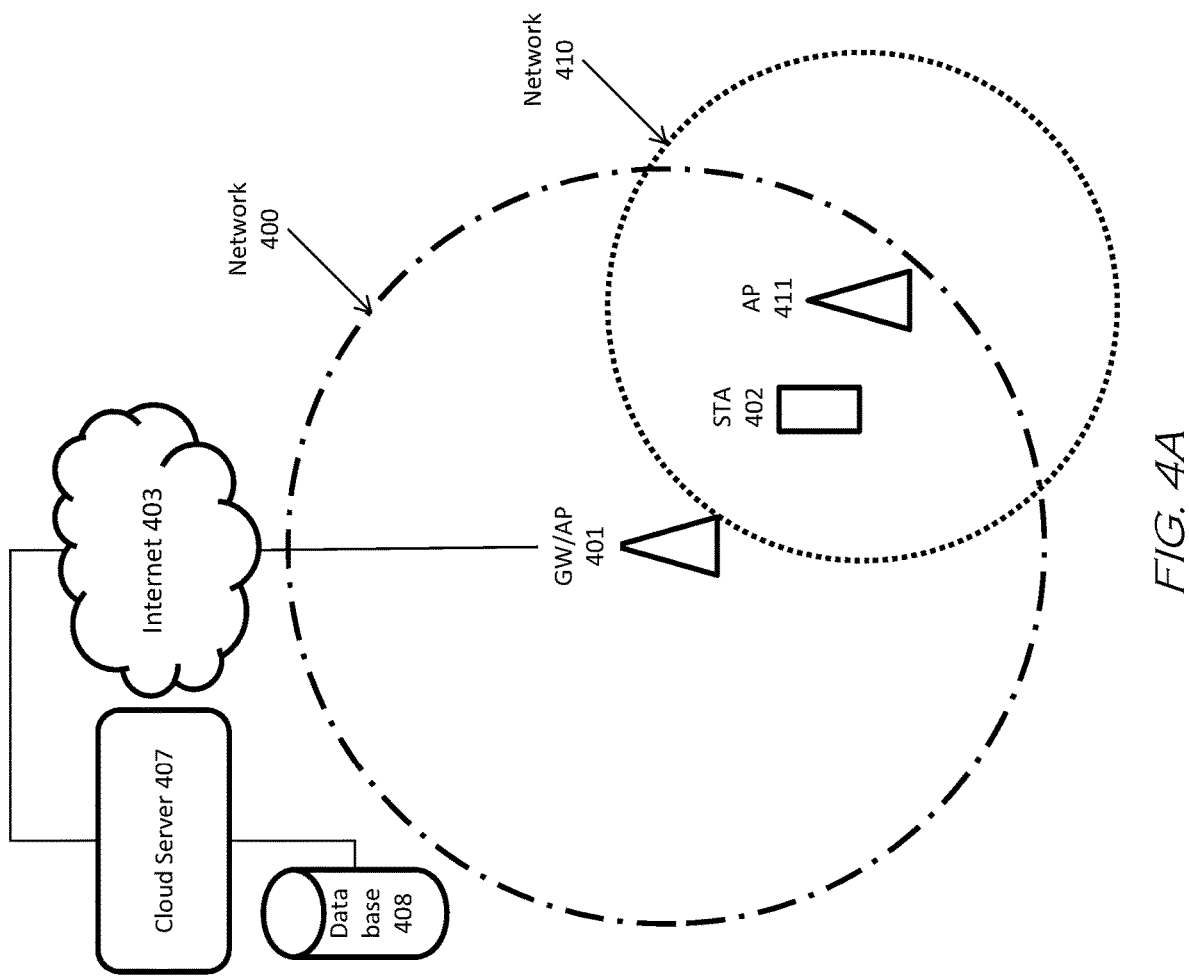
FIG. 4A illustrates an example communication system where an access point is added to a wireless network.

FIG. 4A illustrates an example communication system where an access point is added to a wireless network. There may be a GW/AP 401 with a network 400 (wired and/or wireless) and a new AP 411 may be added using one or a combination of techniques described herein. the GW/AP 401 may be connected to a Cloud Server 407 through the internet 403. The Cloud Server may be connected to a database 408 that stores public key information.

FIG. 4B illustrates an example process for adding an access point to a communications system using cloud assistance in an automated manner. At 451, the public key information for that AP 411 may be stored in a database 408. At 452, a customer may contact the BSP and place an order for a new WiFi AP 411. At 453, the BSP may process the order using the cloud server for that customer's account. Alternatively, the BSP may process the order using separate inventory management and order processing systems. The cloud server may reserve AP 411 to the customers account and mark the serial numbers and or MAC addresses identifying the new APs to be shipped. At 545, the cloud server may then access the database with the public key information based on the marked information about AP 411 in the order. Database 408 may be local or remote to the cloud server.

At 455, since cloud server knows which particular AP 411 will be shipped to the customer, it may send the public key to the GW/AP 401 through the Internet connection 403 as parameters of the custom command "AddNewNode" based on which GW/AP 401 is associated with the customer's account.

At 456, the GW/AP 401 may then encrypt its network credentials and place the resulting ciphertext in the Application Extension attribute of its WSC IE. At 457, once the AP 411 arrives and turns on, the AP 411 may decrypt the ciphertext and proceed with configuration, similar to other processes discussed herein. However, it may take one or more days for the new AP 411 to arrive if it is shipped to the customer, and increasing the lengths of beacons and probe responses unnecessarily in the meantime may waste precious airtime. In one approach, the credentials ciphertext may not be included in every beacon but instead may be inserted in every $n^{th}$ beacon (e.g., $10^{th}$ beacon). This period may be adjusted to strike a balance between the airtime savings and the introduced setup delay when the new APs arrive and are powered on (due to both having to wait longer for the next beacon with ciphertext and increased probability of missing the beacons with ciphertext while scanning all available channels).

In another approach, the ciphertext may be included only in WSC IEs of probe responses and then only when the GW/AP 401 receives a probe request from the MAC addresses of the new AP 411. The MAC address may be transferred over with the order in one embodiment, or may be included in the QR code as identifying information for embodiments where a mobile STA triggers the new AP. While this approach does offer benefits, in some circumstances it may not always be possible to configure customized probe requests due to wireless device driver limitations.

As discussed herein, for provisioning multiple APs simultaneously, the ciphertext for each new device may either be added to beacon WSC IEs all together or at most a predetermined number of ciphertexts may be added to each beacon in a round-robin fashion to save airtime. Also, for probe responses, the GW/AP may only respond with one ciphertext in the Application Extension attribute of the WSC IE, corresponding to the public key of the new AP that sent the probe request.

The strength of a public key cryptography system may rely on the computational impracticality for a properly generated private key to be determined from its corresponding public key. Common public key cryptography systems may be Rivest-Shamir-Adleman (RSA) and Elliptic-Curve Cryptography (ECC). For RSA, one recommended key size may be at least 2048 bits. For ECC, a similar level of encryption strength may be achieved with keys of 256-bit length. As the smaller key size means that less information has to be encoded into the QR code, the resulting QR codes for ECC keys may be less dense and consequently easier to read by a mobile scanner application.

The amount of information that may be encrypted with asymmetric cryptography may have a limit and may be a small amount of information. If the size of the network credentials is above this limit, symmetric cryptography may need to be used, for example AES, to encrypt the credentials with a randomly generated key and then encrypt this random AES key with the public key of a new AP and include both ciphertexts in the WSC IEs so that the new AP may first decrypt the random AES key with its private key and then decrypt the credentials with this AES key.

Although multiple WSC IEs may be transmitted in a WiFi frame, in some circumstances there may be wireless driver limitations that cannot carry out this feature. In such a case, using Public Action frames defined in 802.11u may assist when the WiFi client and AP are in an unauthenticated and unassociated state. The frame exchange process Generic Advertising Protocol (GAS) Request/Response, and framing format (802.11 Action frames) provided by GAS for advertisement services may be employed for the transmission of ciphertext from a GW/AP to a new AP.

While QR codes were discussed in embodiments and examples herein, this is not intended to limit this disclosure and is only one possible out-of-band method for initiating the secure provisioning of a new AP. Other techniques such as Near Field Communication (NFC), Bluetooth Low Energy (BLE), and other techniques from the WiFi Alliance Device Provisioning Protocol may be used as an out-of-band method for securely provisioning a new AP. It follows that the display of a public key through QR codes may be extended to the transfer of public key via NFC or BLE.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a communications interface for use in a GW, STA, AP, terminal, base station, RNC, or any host computer.

What is claimed:

1. A cloud server for facilitating an automated secure configuration of one or more new 802.11 access points (APs) to a network, the cloud server comprising:
a processor connected to a memory, the processor configured to execute instructions stored in the memory;
a physical communications interface connected to the processor, the physical communications interface and the processor configured to receive a message associated with a customer account regarding the one or more new 802.11 APs, associate a first wireless AP, of the one or more new 802.11 APs, that is previously unassociated with the network with the customer account based on the message, and retrieve a first public key of a first public-private key pair associated with the first wireless AP; and
the physical communications interface and the processor further configured to send the first public key to a gateway (GW) associated with the customer account, and instruct the GW to encrypt network credentials including an SSID and a password of the GW based on the first public key into a first ciphertext and wirelessly broadcast the first ciphertext to securely associate the first wireless AP that has a first private key of the first public-private key pair to the network.

2. The server of claim 1, further comprising:
the communications interface and the processor configured to associate a second wireless AP, of the one or more new 802.11 APs, that is previously unassociated with the network with the customer account, and retrieve a second public key of a second public-private key pair associated with the second wireless AP; and
the communications interface and processor further configured to send the second public key to the GW and instruct the GW to encrypt the network credentials including the SSID and the password of the GW based on the second public key into a second ciphertext and have the GW and first wireless AP wirelessly broadcast the second ciphertext to securely associate the second wireless AP that has a second private key of the second public-private key pair to the network.

3. The server of claim 1, wherein the message further includes login information to the customer account and the communications interface and the processor are further configured to condition access to the customer account based on the login information.

4. The server of claim 1, wherein the communications interface and processor are further configured to receive WiFi diagnostics regarding the one or more new 802.11 APs and to send a first recommendation for moving the one or more new 802.11 APs to a mobile STA associated with the customer account to be visually displayed on the mobile STA based on the received WiFi diagnostics.

5. The server of claim 4, wherein the communications interface and processor are further configured to send a second recommendation for moving the one or more new 802.11 APs to be visually displayed on the mobile STA based on receiving second WiFi diagnostics.

6. The server of claim 1, wherein the first public key is retrieved from a database based on a MAC address of the first wireless AP.

7. A method for facilitating an automated secure configuration of one or more new 802.11 access points (APs) to a network carried out by a cloud server, the method comprising:
receiving a message associated with a customer account regarding the one or more new 802.11 APs;
associating a first wireless AP, of the one or more new 802.11 APs, that is previously unassociated with the network with the customer account based on the message;
retrieving a first public key of a first public-private key pair associated with the first wireless AP;
sending the first public key to a gateway (GW) associated with the customer account; and
instructing the GW to encrypt network credentials including an SSID and a password of the GW based on the first public key into a first ciphertext and to wirelessly broadcast the first ciphertext to securely associate the first wireless AP that has a first private key of the first public-private key pair to the network.

8. The method of claim 7, further comprising:
associating a second wireless AP, of the one or more new 802.11 APs, that is previously unassociated with the customer account;
retrieving a second public key of a second public-private key pair associated with the second wireless AP;
sending the second public key to the GW; and
instructing the GW to encrypt the network credentials including the SSID and the password of the GW based on the second public key into a second ciphertext and instructing the GW and first wireless AP to wirelessly broadcast the second ciphertext to securely associate the second wireless AP that has a second private key of the second public-private key pair to the network.

9. The method of claim 7, wherein receiving the message further includes receiving login information for the customer account and, conditioning access to based on the login information.

10. The method of claim 7, further comprising:
receiving first WiFi diagnostics regarding the one or more new 802.11 APs; and
sending a first recommendation for moving the one or more new 802.11 APs to be visually displayed on a mobile STA associated with the customer account based on the received first WiFi diagnostics.

11. The method of claim 10, further comprising:
receiving second WiFi diagnostics after the first WiFi diagnostics regarding the one or more new 802.11 APs; and
sending a second recommendation for moving the one or more new APs to be visually displayed on the mobile STA based on received second WiFi diagnostics.

12. The method of claim 7, wherein the first public key is retrieved from a database.

13. A gateway (GW) for facilitating the automated configuration of one or more new 802.11 access points (APs) in a network of the GW, the GW comprising:
a processor connected to a memory, the processor configured to execute instructions stored in the memory; and
a communications interface connected to the processor, the communications interface and the processor configured to receive a first public key of a first public-private key pair associated with a first wireless AP, of the one or more new 802.11 APs, that is previously unassociated with the network from a cloud server, receive instructions from the cloud server to encrypt network credentials including a SSID and a password of the GW using the first public key into a first ciphertext, wirelessly broadcast the first ciphertext for securely associating the first wireless AP that has a first private key of the first public-private key pair to the network, and register the first wireless AP into the network of the GW upon receipt of a request from the first AP.

14. The GW of claim 13, further comprising:

the communications interface and the processor further configured to receive a second public key of a second public-private key pair associated with a second wireless AP, of the one or more new 802.11 APs, that is previously unassociated with the network, to receive instructions from the cloud server to encrypt the network credentials of the GW using the second public key into a second ciphertext, and to wirelessly broadcast the second ciphertext through the first wireless AP that has been associated to configure the second wireless AP that has a second private key of the second public-private key pair to the network.

15. The GW of claim 13, wherein the communications interface and processor are further configured to receive first WiFi diagnostics from the first wireless AP and to send the first WiFi diagnostics to the cloud server.

16. The GW of claim 14, wherein the communications interface and processor are further configured to receive second WiFi diagnostics from the second wireless AP through the first wireless AP and to send the second WiFi diagnostics to the cloud server.

17. The GW of claim 13, wherein the first ciphertext is sent using a Generic Advertising Service (GAS) Request/Response and sent in a Public Action Frame of 802.11u.

18. The cloud server claim of 1, wherein the communications interface and the processor is further configured to receive a user indicated SSID and password, wherein the received user indicated SSID and password are used as the credentials.

19. The cloud server of claim 1, wherein the communications interface and the processor is further configured to receive a bar code or QR code with the received message associated with the first wireless AP indicating the MAC address of the first wireless AP.

20. The cloud server of claim 1, wherein the communications interface and the processor is further configured to reserve the first wireless AP based on the received message, wherein reserving includes determining the MAC address and serial number of the first wireless AP.

21. The method of claim 7, further comprising receiving a user indicated SSID and password, wherein the received user indicated SSID and password are used as the credentials.

22. The method of claim 7, further comprising receiving a bar code or QR code with the received message associated with the first wireless AP indicating the MAC address of the first wireless AP.

23. The method of claim 7, further comprising reserving the first wireless AP based on the received message, wherein reserving includes determining the MAC address and serial number of the first wireless AP.

\* \* \* \* \*